United States Patent
Bommi et al.

(10) Patent No.: US 7,507,338 B2
(45) Date of Patent: Mar. 24, 2009

(54) UNIVERSAL WATER PURIFIER UNIT ASSEMBLY DEVICE

(75) Inventors: Govind Bommi, Bayshore Park (SG); Krishna Murthy Bommi, Bangalore (IN)

(73) Assignee: Filtrex Holdings Pte Ltd., Parklane Mall (SG)

(*) Notice: Subject to any disclaimer, the term of this patent is extended or adjusted under 35 U.S.C. 154(b) by 99 days.

(21) Appl. No.: 11/549,535

(22) Filed: Oct. 13, 2006

(65) Prior Publication Data
US 2008/0087596 A1    Apr. 17, 2008

(51) Int. Cl.
| | |
|---|---|
| C02F 1/28 | (2006.01) |
| C02F 1/44 | (2006.01) |
| C02F 1/50 | (2006.01) |
| C02F 9/00 | (2006.01) |
| C02F 9/02 | (2006.01) |
| B01D 27/08 | (2006.01) |
| B01D 36/02 | (2006.01) |
| B01D 35/26 | (2006.01) |

(52) U.S. Cl. .......... 210/232; 210/266; 210/282; 210/416.3; 210/314; 210/321.6; 222/209

(58) Field of Classification Search ............. 210/232, 210/266, 282, 416.3, 314, 321.6; 222/209
See application file for complete search history.

(56) References Cited

U.S. PATENT DOCUMENTS

| | | |
|---|---|---|
| 3,905,520 A | 9/1975 | Nishioka |
| 3,955,720 A | 5/1976 | Malone |
| 3,972,694 A | 8/1976 | Head |
| 4,054,526 A | 10/1977 | Muller |
| 4,113,147 A | 9/1978 | Frazier et al. |
| 4,151,092 A | 4/1979 | Grimm et al. |
| 4,212,743 A | 7/1980 | Van Meter et al. |
| 4,238,054 A | 12/1980 | Chen |
| 4,306,971 A | 12/1981 | Hankammer |
| 4,310,104 A | 1/1982 | Takatsuki |

(Continued)

FOREIGN PATENT DOCUMENTS

JP    45-000637 B  *  1/1970

(Continued)

*Primary Examiner*—Thomas M Lithgow
(74) *Attorney, Agent, or Firm*—Levenfeld Pearlstein, LLC

(57) ABSTRACT

A universal water purifier unitary assembly device comprising a device housing unit support structure, a manually operated air pump, a force-fed water filter cartridge of multiple separable stages and a separable sealing means to seal the junction and opening between said universal water purifier unitary assembly device housing unit support structure and water container of water to be filtered wherein junction and opening between of said water purifier unitary assembly device housing unit support structure and said water container is sealed to retain compressed air. Water of said container is filtered, treated and used as needed on demand as in a group environment wherein individual use and consumption of purified water is relevant. The water is stored in a container, being pumped from the container by compressed air provided by an air pump. Filter elements include sediment and cyst removal filters, ion exchange resins, semi-permeable membranes including a hollow fiber membrane, porous activated carbon particles and activated carbon blocks. The device housing unit support structure unifies the functional elements of the invention as an operational unit of easy transport for use with any water container of a suitably sized mouth.

18 Claims, 3 Drawing Sheets

U.S. PATENT DOCUMENTS

| | | | |
|---|---|---|---|
| 4,359,174 A | | 11/1982 | Ikunosuke et al. |
| 4,636,307 A | * | 1/1987 | Inoue et al. ................. 210/188 |
| 4,969,996 A | | 11/1990 | Hankammer |
| 5,120,438 A | * | 6/1992 | Nakagawa et al. .......... 210/256 |
| 5,225,078 A | | 7/1993 | Polasky et al. |
| 5,268,093 A | | 12/1993 | Hembree et al. |
| 5,431,813 A | | 7/1995 | Daniels |
| 5,545,315 A | | 8/1996 | Lonneman |
| 5,733,448 A | | 3/1998 | Kaura |
| 6,136,189 A | * | 10/2000 | Smith et al. ................. 210/266 |
| 6,290,848 B1 | | 9/2001 | Tanner et al. |
| 6,569,329 B1 | * | 5/2003 | Nohren, Jr. ................. 210/282 |

FOREIGN PATENT DOCUMENTS

| | | | |
|---|---|---|---|
| JP | 62-132586 A | * | 6/1987 |

* cited by examiner

UNIVERSAL WATER PURIFIER UNIT ASSEMBLY DEVICE

FIELD OF THE INVENTION

This invention relates to a universal water purifier unit assembly device as an integrated assembly functioning as an operational unit of easy transport to be positioned for use with any container of water to be treated and filtered. In particular, this invention relates to a water treating and filtration device comprising a unit housing structure, an in-place manually-operated bellows air pump and a structural filter cartridge assembly comprising a multistage filter system. The unit mounted bellows air pump provides compressed air to cause the untreated water to be forced through the structural filter cartridge. The filter cartridge comprises novel structural components which, alternatively, can be surface treated to increase water flow rate. A means is provided for sealing the water purifier assembly device to a water container of any size and shape to retain compressed air within the constructed system of the water purifier assembly device and the water container.

The universal water purifier assembly device comprises an assembly device unit housing structure, an air pump mounted thereon, a filter cartridge of multiple stages and filters in sealed connection to each other, and a fluid discharge outlet spout contained within the assembly device unit housing structure. The universal water purifier assembly device is sealed in position above any fluid container of water to be purified, the container of water having a suitably sized mouth. A sealing member engages the unit housing structure of the universal water purifies assembly device and seals the contact between the housing structure and the container of water. The number of stages in the multiple filter cartridge is limited only by the number of stages necessary to provide a suitably acceptable water purified of noxious chemicals and contaminants, and air pump capacity to supply sufficient pressurized air to force the water to be purified through the multistage filter cartridge and filters.

BACKGROUND OF THE INVENTION

This invention relates to a water container unit mounted water filtering system. More particularly, the instant invention is directed to a universal batch treatment and filtration device wherein water is filtered, treated and used as needed on demand, as for example, in a group environment wherein individual use and consumption of purified water is relevant. The water to be treated is stored in any suitable container to be filtered, treated and force-pumped from the container as needed by the user, being pumped from the water container into a drink cup. The universal water purifier assembly device comprising the assembly housing structure, the force pump, the filter cartridge and the means of sealing the device to the water container function as a self-contained water treatment system wherein the filtration assembly is mounted on the water container. The treated water flows from a spigot mounted proximate to the air pressure bellows pump. The water treatment system relies upon air pressure provided by the bellows pump to force water through the filter cartridge to remove harmful contaminants from the water. The water container acts as a reservoir of untreated water to be filtered and treated. The air pressure generated by the bellows pump pressurizes the void of the water container and thereby causes the contaminated water within the water container to flow through the filter cartridge and out the spigot into a drink cup.

The presence of unwanted and potentially harmful contaminants in drinking water are a cause for health concern. This concern causes a desire for water treatment devices suitable for use in the home and as portable instruments for water treatment. As a result, many water treatment devices and methods have been developed to remove contaminants or otherwise treat the water to obtain a suitable drinking water.

Some of these water treatment devices and methods utilize treatment materials, which, of their own nature, can be distasteful to consumers of the treated water. For example, municipal water treatment facilities use chlorine as an active agent to remove bacterial contaminants but the odor and taste of the treated water can be offensive to the consumers. It is known to use activated carbon to treat water to remove the offensive odor and taste of chlorine-treated water but flow rate of water through the activated carbon can be hampered.

In addition to chemical and particulate contaminants, several types of harmful contaminants in drinking water are a cause for health concern. Even municipal water treatment fails to adequately remove all of the hazardous contaminates. Many municipal systems use chlorine as disinfectant to remove bacteria. It is known that excess chlorine normally used by the municipality is in itself a source to create harmful chemicals commonly known as disinfectant-by-products, (DBP). These DBP, along with herbicides and pesticides, often present and known as volatile-organic-chemicals (VOC), are harmful chemicals in the water system. Besides these volatile-organic-chemical contaminants, biological contaminants including protozoan cysts as Giardia, lamibial and Cryptosporidium, excreted by animals, are present in certain waters.

Cysts are not easily removed by conventional oxidizing agents. Common methods of removing cysts are to trap them in a filter that has porosity less than 2 microns. Such filters with pore sizes less than 2 microns typically are used in water purifier systems that provide water line pressure.

Gravity filtration is one of the oldest ways of filtering water. Starting from a simple filter cloth to remove suspended impurities to carbon granules along with certain ion exchange media to remove chlorine and certain heavy metals, gravity filtration systems have upper and lower chambers separated by the filter cartridge. The system relies on gravity of the untreated water in the upper chamber to force the water through the cartridge and into the lower chamber thereby producing filtered water. These gravity filtration systems used in homes vary in sizes, defined by the capacity of the two chambers. One such gravity filtration system commonly used in homes is the carafe type of filter with the top container having a capacity less than 3 liters. The gravity pressure of the untreated water is sufficient to force the water through a limited amount of activated carbon granules and ion exchange resins.

However, gravity pressure of water is typically not sufficient to force the water through a semi-permeable membrane, if such is used. An additional force source is needed to force the water through the membrane.

In the instant invention, bellows pump air pressure is used to force water through the filter cartridge comprising filters and water treatment materials to remove harmful contaminants and particulate matter from the water.

In the prior art, replaceable filter cartridges for household use have been taught and claimed. U.S. Pat. No. 4,212,743 to Van Meter et al. teaches and claims a filter cartridge of particles of activated charcoal and other suitable absorbent material wherein the cartridge is contained within a housing. Water is filtered by passing it through the tubular wall of the cartridge by the space between the cartridge and the housing toward the outlet or the inside of the tubular cartridge. The filter cartridge is generally cup-shaped. The filter cartridge structure provides a long flow path of approximately seven inches for water traveling from the inlet to the outlet to provide effective odor and taste filtering of the water with a long contact time.

U.S. Pat. No. 3,972,694 to Head teaches and claims a filter tube comprising a plurality of randomly disposed glass fibers having intersections between to define the porosity of the filter. The glass fibers are bonded at the junctions of the fiber cross-overs with a hardened silicone resin bonding agent, the fibers interrelated to form a semi-rigid mass of desired porosity to incorporate an outer absorbent activated carbon-filled filter sleeve. The bonding agent typically may be phenal-formaldahyde or epoxy resins or other thermosetting-type resins. However, the bonding agent can impart hydrophobicity to the filter and restrict the scope of the filter applications and organic bonding agents can have a color, which darkens with sunlight and use.

U.S. Pat. No. 5,225,078 to Polasky et al. teaches and claims a pass-through pitcher filter comprising a compact filter element including a thin annular disk of molded granular activated carbon and a peripheral annular seal element. The seal element allows the filter to be replaceably mounted on the lower end of an upper plastic reservoir, which reservoir is adapted to be supported in the top of a pitcher for receiving filtered water. The plastic reservoir for water to be treated and the filter are placed on a pitcher for receiving and dispensing the treated water. Such assemblies rely on gravity flow of the water from the reservoir to the pitcher via the filter. The seal element utilizes a synthetic rubber material and is preferably molded around the carbon filter disk. The filter element is made from a rigid sintered block of activated granular carbon. The carbon block is made from granular activated carbon and a suitable binder, such as polyethylene, compressed and heated to form a molded porous block. In the preferred embodiment, a carbon block has a nominal 20-micron porosity and is approximately ½ inch (13 mm) thick and 4¼ inches (5.5 cm) in diameter. An annular synthetic rubber seal is attached to the periphery of the carbon block. The seal may comprise a neoprene-like material. The seal is formed by injection molding around the carbon block. When the filter element is used initially or after it has remained unused for a period of time, surface tension between water in the reservoir which is to be filtered and the dry porous carbon block may inhibit normal gravity flow of the water through the filter element. To initiate flow, manual pressure is applied to the bellows element of the reservoir to compress air in the reservoir to force water through the carbon block to initiate water flow.

In the prior art, U.S. Pat. No. 6,290,848 to Tanner et al. teaches and claims a filter cartridge for a gravity-fed water treatment device comprising a hydrophilic porous particulate filter having an interior volume filled with an granular filter media comprising granular activated carbon, an ion exchange resin or a combination thereof. The porous particulate filter is microporous, comprises pleated sheet filter media, and is arranged to establish a pressure of about 0.5 lb./in$^2$ a flow rate of water by gravity through the filter cartridge. The preferred form of carbon of use is granular activated carbon. The preferred granular media for use in the filter cartridge is a mixture of a weak-acid cation exchange resin and granular activated carbon. Such a device has a low flow rate, which is not practical for a gravity fed water treatment device. To overcome this limitation, the porous particulate filter contains hydrophilic material. The porous glass fiber and hydrophilic binder provides water that has 99.95% of 3-5 micron cyst particles removed. However, such a device does not typically remove volatile-organic-chemicals as not being capable of doing so without specified treating chemicals or materials Other prior art patents disclose procedures and structures relating to portable water filters. U.S. Pat. No. 4,151,092 to Grimm et al. teaches use of a manual pump to force liquid from a first container through a filter to treat the liquid at a suitable rate. U.S. Pat. No. 4,306,971 to Hankammer and U.S. Pat. No. 4,969,996 to Hankammer disclose a cup-shaped insert for a granular purifying agent to purify water. U.S. Pat. No. 5,268,093 Hembree et al. teaches use of a plunger to force unfiltered water through a filter.

In the prior art, the idea of dispensing liquid from a container using air pressure inside the container is well known. U.S. Pat. No. 3,955,720 to Malone describes a reusable dispensing apparatus for dispensing a flowable product by pressurized air. The air pressure is created by an internal air pump operated by the user. U.S. Pat. No. 3,905,520 to Nishioka describes a means of pouring a liquid contained in vacuum flask without tilting the flask or opening the lid. The liquid is pumped up a tube by the pressure created by bellows design pump in the lid of the flask. This type of device, usually a thermos flask, to dispense either hot or cold liquid, which has a bellows-type of pump in the lid, is commonly known as an "air pot". A further modification and easy dispensing of the fluid is described in U.S. Pat. No. 4,113,147 to Frazier et al. and U.S. Pat. No. 4,310,104 to Takatsuki. Newer "air pots" were designed wherein the water tube is concealed in the wall of the container as explained in U.S. Pat. No. 4,359,174 to Ikunosuke et al. and U.S. Pat. No. 4,238,054 to Chen. Based on the above, numerous products are available that use either simple bottles to dispense fluids or use thermos flasks to dispense hot or cold fluids into a cup without opening the lid or tilting the flasks.

U.S. Pat. No. 4,054,526 to Muller describes how pressurized water flows through a purifier cartridge. An external pump creates the pressure. U.S. Pat. No. 5,733,448 to Kaura shows the use of a bellows pump to push the water from one chamber to another lower chamber having a purifier between the two chambers. U.S. Pat. No. 5,431,813 to Daniels describes a water purifier cartridge in the neck of a bottle. Pressure is created inside the bottle by squeezing the sides of the bottle, which pushes the water through the purifier cartridge. In U.S. Pat. No. 5,545,315 to Lonneman, water to be purified flows up longitudinally inside the purifier cartridge. The pressure to enable the flow of water is created by a combination of squeezing the sides of the bottle and also sucking on the outlet mouthpiece.

Accordingly, it is an object of this invention to provide a universal fluid filter and water purifier assembly device having improved fluid flow as compared with prior art filters.

It is another object of this invention to provide an improved unit water filtration and purifier treatment device for use with a container of any rigid material and of any size and shape.

It is another object of this invention to provide a universal filter and water purifier assembly device capable of removing harmful chemicals known as disinfectant-by-products (DBP) and volatile-organic-chemicals (VOC) and protozoan cysts from contaminated water in multiple containers by using the universal filter and water purifier device in separate applications to each of the multiple containers.

It is another object of this invention to provide a fluid filter having elements comprising a semi-permeable membrane and a hydrophilic filter sheet having a porosity within the range of from 2 to 25 microns.

It is another object of this invention to provide a universal filter and water purifier assembly device comprising a structural filter cartridge assembly comprising a multistage filter system comprising multiple filters comprising, selectively, a semi-permeable membrane, a hollow-fiber membrane, a molded porous polymeric material including a ceramic, non-woven fabric, a pleated filter of 2 micron filter paper and/or of 2 micron ceramic construction, and an air pressure pump to provide compressed air to the closed water container.

It is another object of this invention to provide a universal water purifier assembly device for use as a self-contained compressed air unitary water treatment system to be used on small table top models and large size units as selected by the user.

It is another object of this invention to provide a universal fluid filter having suitable structural characteristics by use of plastic material of suitable structural strength as the structural material.

It is another object of this invention to provide an annular seal element to seal the junction between the universal water purifier unitary assembly device and the mouth of the water container to retain compressed air within the water container.

SUMMARY OF THE INVENTION

This invention related to a compressed air water filtration and purifier treatment device comprising a device housing unit support structure, an air pressure bellows pump, a force-fed water filter cartridge of multiple stages, a fluid discharge outlet in sealed connection to said force-fed water filter cartridge and a sealing means comprising an annular seal element to seal the junction between the device housing unit support structure and a water container of water to be treated and filtered, wherein said junction is sealed to retain the compressed air. The device housing unit support structure comprises an essential element of the invention in that the device housing unit support structure provides that the elements of the water treatment device are in close physical proximity together as an easily transportable operational unit to be positioned atop any suitable container of water to be treated and filtered.

The housing unit support structure is defined as an essential element of the invention as the housing unit support structure in that the said structure encompasses and supports the air bellows pump, the air pump air flow outlet, the water flow outlet spout and supports the structural filter cartridge assembly wherein the said support structure is a single unit structure.

This invention relates accordingly to a water treatment device comprising a water container, a container-mounted air pressure bellows pump, and a force-fed water filter cartridge comprising structural filter components which remove filter particulates and harmful contaminants from the water to meet NSF 53 standards for treated water as to volatile-organic-chemicals (VOC) and number of 3- to 4-micrometer particles present in an influent water level per milliliter by at least 99.5%. The structural filter component and polymeric binder filter component can have surface modification to make the filter component and polymeric binder hydrophilic.

The filter cartridge comprises multistages of container shells of suitable plastic material to provide structural strength to the container shell. The multistages can comprise multiple single stages mounted in conjoined manner to provide fluid flow thereby through each conjoined filter of individual purpose. The multistages can comprise a first stage of a sediment and cyst removal filter; a second stage of disinfectant resins and a semi-permeable membrane or a hollow fiber membrane; and a third stage of a polymeric binder matrix of selected shaped small pore size activated carbon particles and carbon blocks of activated carbon powder of a mesh size of 80×300 and mesh sizes ranging from 100×280 to 100×320. A fourth stage, as with fifth, sixth and more stages, can each comprise a separate filter stage of individual function to overcome the presence of contaminants of a particular distinction. The wall thickness of each shaped carbon block of the third stage is in the range of from 3 m to 10 mm. Ultrahigh molecular weight polyethylene (UHMWPE) can be used as the binder in the carbon block. In the first filter stage which comprises a sediment and cyst filter, the filter stage can comprise a hydrophilic filter sheet having porosity in the range of from less than 2 microns to 25 microns, can cover the water inlet holes of the filter cartridge shell, and provide support for contaminant removal resins, ion exchange resins and other filtering media as a first stage in the lower portion of the filter cartridge shell. The first stage can comprise a pleated filter using 2 micron filter paper or a ceramic filter. The first stage filter media can include specified chemicals and materials to provide capability to remove volatile-organic-chemicals and cysts. The second filter stage can comprise disinfectant resins, ion exchange resins, and other filtering media including semi-permeable membranes comprising a semi-permeable membrane or a hollow fiber membrane as an element of the replaceable filter cartridge. The third stage can comprise activated carbon as described above to remove remaining contaminants and to polish the effluent water. The fourth, fifth and succeeding stages can comprise separate filter stages of individual function to provide separate purifying functions.

In operation, the water container mounts the unitary assembly as an operational unit comprising the support structure, the air pressure bellows pump, the filter cartridge inserted within the water container and the annular seal element to seal the unitary assembly to the water container. Compressed air generated by the bellows pump applied to the water content of the container forces the contained water through the filter cartridge, up from the container and into a drink cup as needed by the user. The generated air pressure is retained within the void of the contaminated filter water container by the annular peripheral container seal ring. In an exemplified embodiment, the annular peripheral container seal ring is a resilient annular gasket positioned around the support structure of the water purifier assembly device and the opening or mouth of the contaminated water container to seal the junction between the filter assembly device and the container mouth to retain the pressurized air. The thereby pressurized water is retained within the filter stages by O-rings sealing each stage to the following joined stage.

BRIEF DESCRIPTION OF THE DRAWINGS

FIG. 2 illustrates the sediment removal filter 41 in stage one 70, the disinfectant and semi-permeable membrane 35 in stage two 71 and the activated carbon filter matrix element 43 in stage three 72. A partial view of the engaging housing unit structure 50 is provided. A removable pleated annular filter can be inserted in stage 1 and stage 2 for added filtration of sediment and contaminants.

DESCRIPTION OF AN EXEMPLIFIED EMBODIMENT

Figure 1:
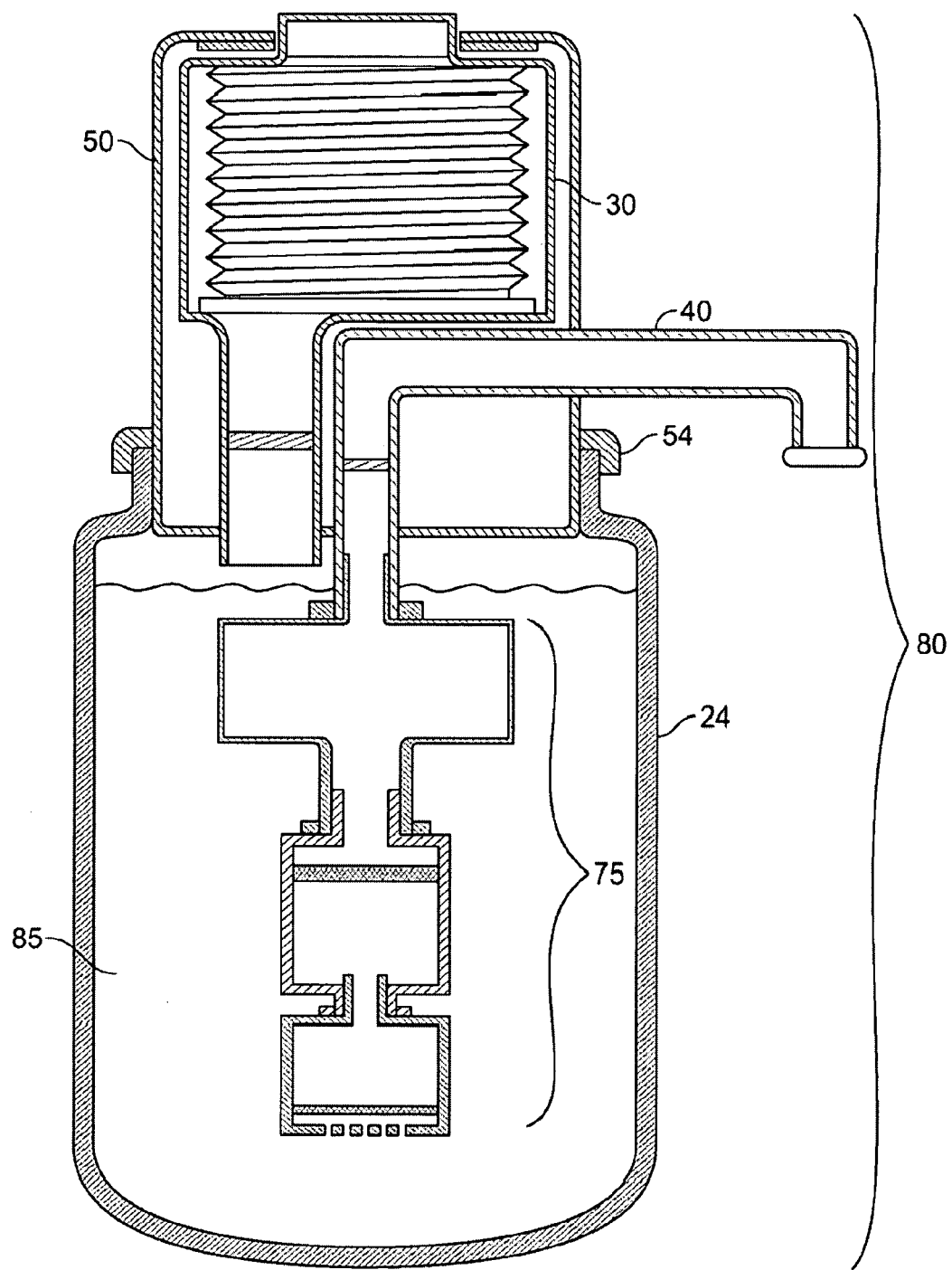
FIG. 1 is a cross-sectional view of an exemplified embodiment of the compressed air unitary water treatment system comprising the universal water purifier assembly device 80 mounted on a water container 24 with the filter cartridge 75 within the water container 24 and the housing structure 50 and bellows pump 30 mounted atop the water container 24.
Figure 2:
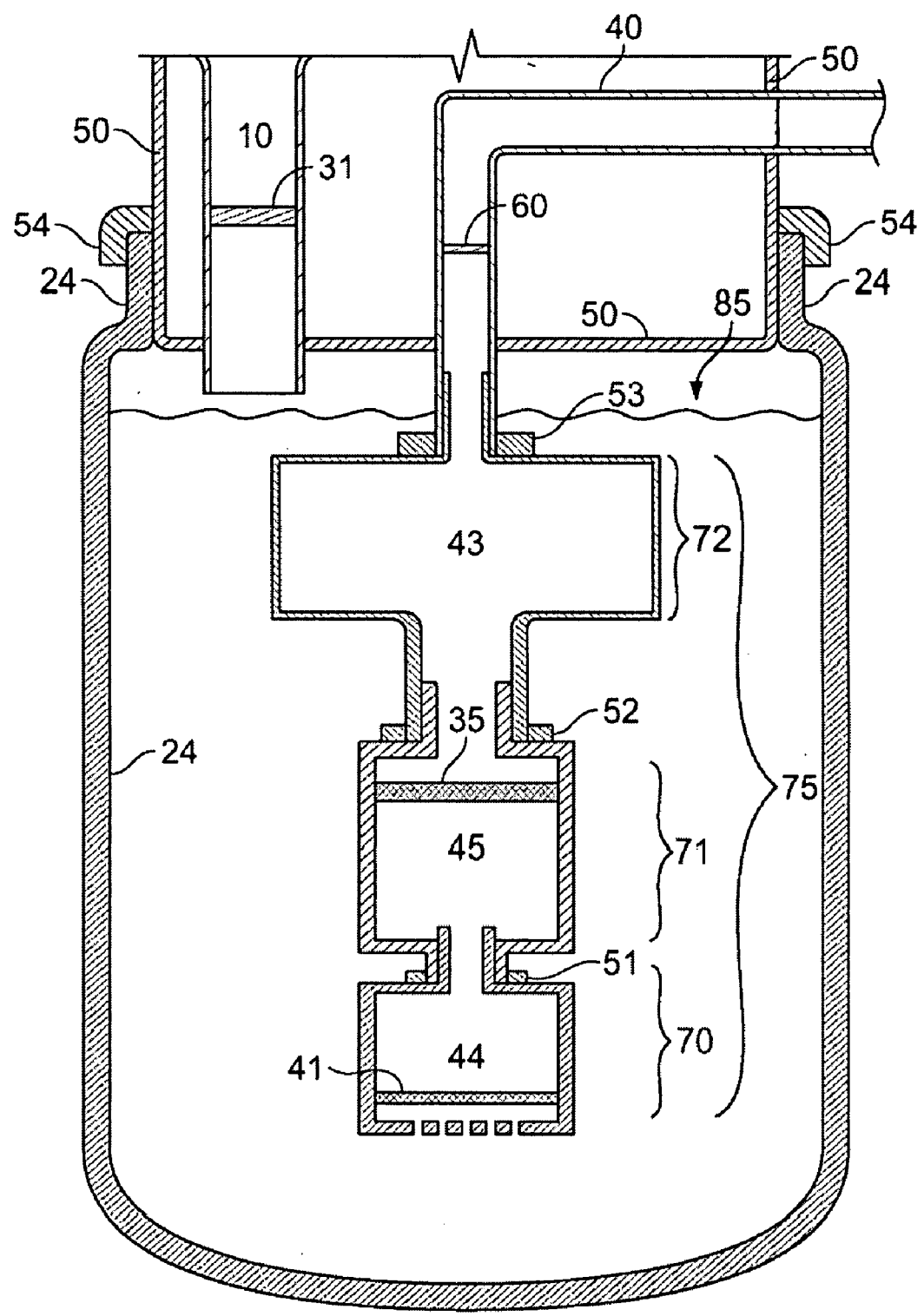
FIG. 2 is a cross-sectional view of three stages of the embodiment of FIG. 1 of the filter cartridge 75 within the water container, 24.
Figure 3:
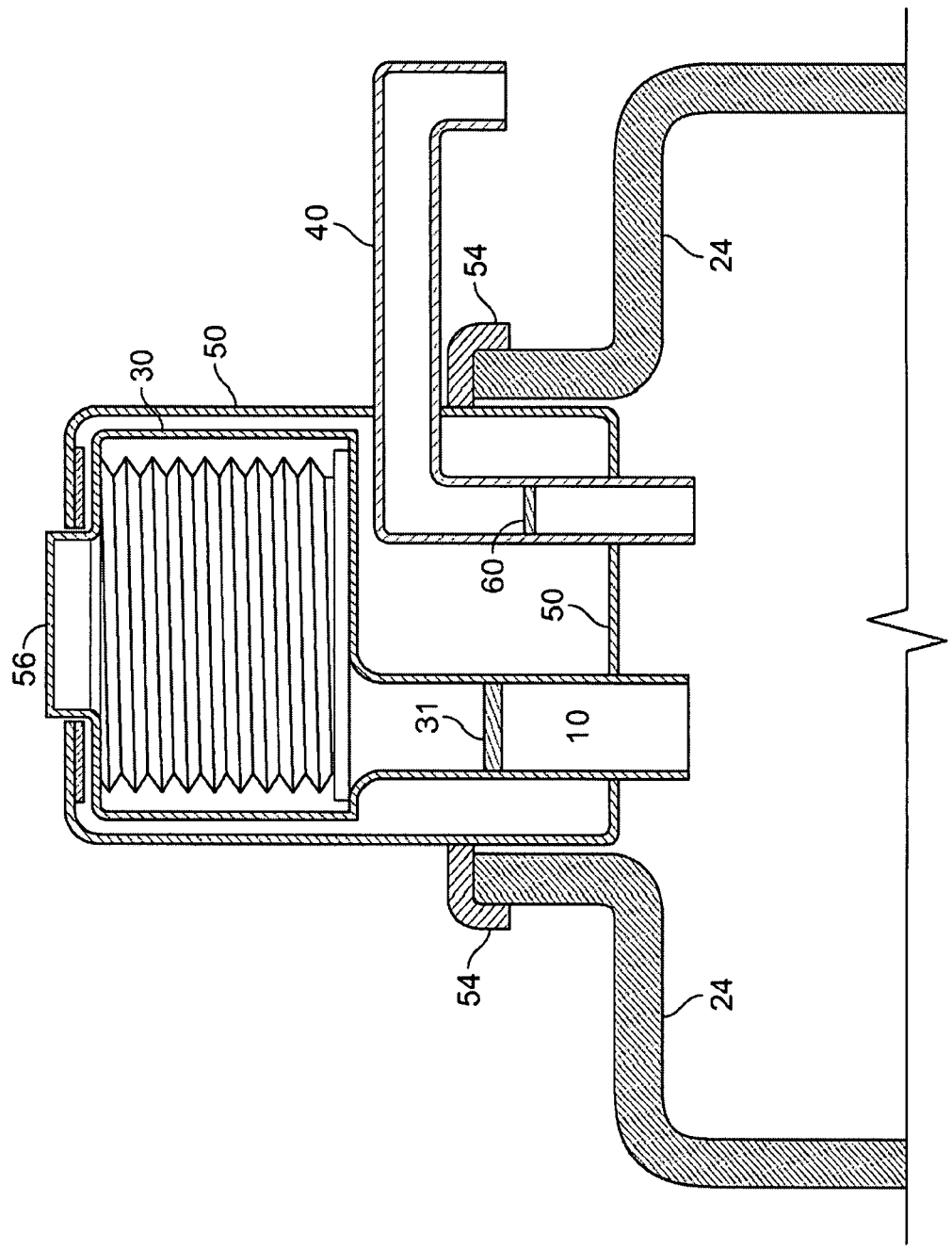
FIG. 3 is a cross-sectional view of the embodiment of FIG. 1 of device housing unit support structure 50 engaging air pressure bellows pump 30 and water outlet spout 40 showing the one-way check valve 31 in the output of the air pressure bellows pump 30 and the one-way check valve 60 in the water outlet spout 40. Pump pressure activator 56 at the top of the pump 30 is shown.

As illustrated in FIG. 1, the unitary universal water purifier assembly device 80 is an operational unit comprising housing unit support structure 50, bellows pump 30 and purifier filter cartridge 75 and is mounted on and within container 24 containing the water 85 to be purified, through the mouth of container 24, the mouth not further identified. As shown in FIGS. 2-3, the exemplified device housing unit support structure 50 mounted within the container mouth supports bellows pump 30 encased in housing unit support structure 50 and purifier filter cartridge 75 of universal water purifier assembly device 80. With pumping action by activator 56 of bellows pump 30, air is forced into container 24, which pressures contained water up purifier filter cartridge 75, and purified water is discharged from outlet spout 40. Sealing means 54 comprising an elastic annular peripheral ring seals the junction between housing unit support structure 50 and water container 24 to retain compressed air generated by air pump 30 within water container 24. With continued pumping of bellows pump 30, purified water continues to flow out of outlet spout 40. When the entire content of water 85 in container 24 is pumped out, universal water purifier assembly device 80 comprising housing unit support structure 50, bellows air pump 30, outlet spout 40 and purifier filter cartridge 75 is taken out of container 24 and container 24 is filled again with water 85 to be purified. The unitary water purifier assembly device 80 comprising housing unit support structure 50, outlet spout 40, bellows air pump 30 and filter cartridge 75 is fitted back within container 24 and pumping can resume to obtain purified water.

Purifier cartridge 75 according to the invention is designed to have the water flow upwards from the bottom of the cartridge. This cartridge is multistage, comprising an exemplified three-stage system. However, the cartridge is not limited to three stages, as additional stages can be added as additional purification needs develop. In this exemplified example, first stage 70, at the bottom of the cartridge comprises the sediment and cyst removal filter stage. The sediment and cyst filter stage comprises a pleated filter 41 of non-woven fabric and ceramic material and molded porous polymeric filter material 44. The porous size of this sediment and cyst filter is between 2 microns to 25 microns depending upon the impurities. The stage one sediment and cyst filter stage 70 is attached with the O-ring 51 and sealed to the second stage 71, which is the disinfection and semi-permeable membrane stage 71. The disinfection stage 71 contains known disinfectants including halogenated resins 45 such as iodinated resin and chlorinated beads. The disinfection stage 71 can also house membrane 35 or hollow fiber membrane 46 (not shown) or semi-permeable membrane 42 (not shown) to act as the barrier against bacteria and virus. The disinfection hollow fiber membrane or semi-permeable membrane stage 71 is connected and sealed to third stage 72 with O-ring 52. Third stage 72 comprises activated carbon granules or carbon blocks 43 for final polishing of the water 85. Stage three purifier cartridge 75 is connected and sealed to outlet spout 40 of filter cartridge 75 with O-ring 53.

Further details of an exemplified embodiment are provided. In stage one 70, the water inlet can be covered by a sediment filter of molded porous polymeric filter material 44 and a non-woven fabric 41 comprising a fine hydrophilic filter sheet or a ceramic filter, each having porosity of less than 2 microns. This hydrophilic filter sheet or ceramic filter covers over the inlet holes and acts as a buffer to trap any cysts in the untreated water.

Stage two 71 in the filter cartridge 75 comprises semi-permeable membrane 35 comprising hollow fiber membrane 46 or semi-permeable membrane 42 and ion exchange resin and other contaminate reducing agents such as disinfectant resins 45. Disinfectant resins are selected from halogenated resins of iodinated resins and chlorinated resin beads. Water is caused to flow through stage one 70, through stage two 71, through the activated carbon blocks 43 of stage three 72 into outlet 40 for treated water. The three separable stages are conjoined and sealed to each other by separate O-rings to preserve water pressure within the filter cartridge. Stages 71 and 72, alternately, can be interchanged based on water conditions.

In this invention, the activated carbon granules and activated carbon blocks are used as purification devices to remove bad taste and odor. They remove chlorine and other reactive chemicals dissolved in the water. Carbon blocks made of activated carbon powder have enormous surface area to remove volatile-organic-chemicals besides bad taste and odor. Depending on particle size and particle size distribution of carbon particles, carbon blocks filters can be of various nominal porosity.

Conventional carbon blocks are generally tubular in design, and having a central hole, water flows from the outer surface radially through the wall thickness into inner space of the carbon block. For water to flow at an acceptable flow rate through the carbon blocks, water needs be forced by pressure through the thickness of the carbon blocks. Conventional carbon block systems are generally used with a water line pressure connection. For cysts reduction ability, carbon blocks have porosity of less than 2 microns. However, in an activated carbon filter system, conventional shaped tubular carbon blocks with less than 2 microns porosity typically will not allow water flow without separate applied force. In this invention, bellows air pump 30 provides air pressure to cause water to flow through purifier cartridge 75 comprising an activated carbon filter stage.

In this invention, the carbon blocks used in stage three are of conventional design shaped in the form of carbon blocks. The water flows through the bottom and sides of the blocks into the inner spaces of the carbon blocks. The flow rate through the shaped carbon blocks is a function of pressurized air in the void above the water in the container, the wall thickness of the carbon blocks and the porosity of the carbon blocks.

Stage three can contain other treatment media in addition to activated carbon particles or granules and/or carbon blocks. Other treatment media can include ion exchange resins selected for selected water treatment capability.

The activated carbon particles or granules or carbon blocks in stage three can be modified to provide higher water flow. Conventional polymeric binders used in the matrix of activated carbon particles and blocks are selected from low density polyethylene (LDPE), ethylene vinyl acetate copolymer (EVA), high density polyethylene (HDPE) and ultrahigh molecular weight polyethylene (UHMWPE). The matrix of carbon and polymeric binder in activated carbon particles or granules or carbon blocks is typically hydrophobic in nature with high surface tension preventing easy wetting of the surface.

The matrix surface of activated carbon particles and carbon blocks with polymeric binder alternatively is surface-modified using an anionic surfactant wetting agent. One such wetting agent is diethylhexyl sodium sulfosuccinate, marketed by Uniqema™ with trade name Monowet 70™. The polymeric binder is ultrahigh molecular weight polyethylene (UHMWPE).

Most commercially available, surfactants used for decreasing surface tension are water-soluble. Monowet 70™ selected in this invention is not water-soluble. Three percent by weight of Monowet 70™ to polymer weight is suitably used in this invention.

In the surface modified embodiment, the modified surface renders the binder surface of the activated carbon particles or granules or carbon blocks hydrophilic. This surface-modified hydrophilic binder increases the attractive force between the binder and water, decreasing the surface tension, allowing faster wetting and hence higher flow rate. Since Monowet 70™ is not water soluble; the surface modified binder remains hydrophilic over an extended period of time as water flows through the activated carbon granules or carbon blocks.

The shaped carbon blocks can be of any size with any wall thickness depending on the size of the device system containers. Sufficient carbon block wall thickness is necessary to increase contact time in order for the carbon blocks to adsorb all the volatile-organic-chemicals. In this carbon block filter system, the suitably sized embodied shaped carbon blocks fit into the upper portion of the embodied cartridge housing shell. Suitable wall thickness of each shaped carbon block for this embodied invention is 10 mm. With surface modified shaped carbon blocks with hydrophilic binder and carbon block wall thickness of 10 mm, acceptable flow is obtained in an air pressure type filter. In this embodiment, the embodied shaped carbon blocks are made of coconut shell based carbon powder with mesh size of 80×300, wherein 95% weight passes through 80 mesh and 10% passes through 200 mesh and 5% passes through 300 mesh. With suitable wall thickness of 10 mm and using carbon powder mesh of 80×300, the nominal porosity of the embodiment carbon blocks is estimated to be 3 microns. The instant embodied shaped carbon blocks with 10 mm wall thickness is capable of removing volatile-organic-chemicals and trapping most cysts. Lead reducing agents can be blended in the carbon and binder mix while making the carbon blocks, as an example of alternative treating chemicals.

It is understood that the thickness of the carbon blocks can be greater than 10 microns, if required for other applications. Such a unit may utilize thicker porous carbon blocks, perhaps as much as 20 mm versus the 10 mm of the current application.

In operation, the user presses pump activator 56 to cause bellows air pump 30 to compress air and force the air into the container 24. Essential elements of the water purifier assembly device to maintain compressed air and pressurized water within the water purifier assembly comprise the O-rings 51, 52 and 53 sealing the three-stage structures of filter cartridge 75 to maintain water pressure within the individual structures of each stage and the container seal ring 54 to seal the contact between housing unit support structure 50 of water purifier assembly device 80 and suitably sized opening or mouth of container 24.

In the invented embodiment of the universal water purifier unitary assembly device suitable for use in containers of any size and shape that have a suitably sized mouth to receive the unitary assembly a separable sealing means is provided as an essential element of this invention. The means of sealing the opening between the housing unit support structure 50 of the unitary assembly 80 and the water container 24 comprises an elastic annular peripheral ring 54 of sufficient size to provide a compression fit around housing unit support structure 50 and a compression fit around the mouth of water container 24. The elastic annular peripheral ring 54 is of sufficient size and elasticity in the peripheral areas of the ring's peripheral structure to stretch over the mouth of the container 24 to provide a compression fit to container 24 to retain compressed air within container 24. The available container mouth, if such is the container opening, may be externally threaded as for closure with an external threaded container top. If such be the case, the outwardly projecting threaded elements of the mouth can serve as anchor elements for the elastic annular peripheral ring around the container mouth. The elastic annular peripheral ring 54, when positioned on housing unit support structure 50 of the water purifier unitary assembly device 80 and over the mouth of the water container 24, seals the opening between the two structures to maintain air pressure within container 24, the air pump having generated the pressurized air of the unitary assembly device 80 and the water container 24.

In summary description of an exemplified embodiment, as illustrated in FIGS. 1, 2 and 3, the exemplified embodiment of the instant invented universal water purifier assembly device comprises three stages which are conjoined and linked together in sealed connection with O-rings to form a filter cartridge. Filter cartridge 75 is mounted in sealed connection to filtered water outlet spout 40. Unitary filter assembly device 80 comprising housing unit support structure 50, outlet spout 40, air pump 30 and filter cartridge 75 are mounted on container 24 and sealed thereto by sealing means 54 to container 24. In FIG. 1, filter assembly 80 comprises housing unit support structure 50, outlet spout 40, air pump 30 and filter cartridge 75. In FIGS. 2 and 3, elastic annular peripheral ring 54 is positioned peripherally on housing unit support structure 50 and on the neck and peripherally over the mouth of container 24. Water container 24 suitably is a bottle providing a suitably sized mouth and support neck (not further identified). The suitably sized mouth of the bottle is suitably of sufficient opening to accommodate insertion of three-stage filter cartridge 75 within container 24 and to permit sealing with container seal 54 of the junction of the universal water purifier assembly device housing unit support structure 50 with the suitably sized mouth of container 24.

FIGS. 2 and 3 illustrate the functioning elements of the invention. This invention relates to a water filter purifier cartridge 75, which is utilized in conjunction with a manually operated bellows-type air pump 30 as a unitary water purifier assembly device and a closed container of water 24. The manually operated bellows-type air pump 30 provides compressed air to the closed water container 24 to which air pump 30 is capable of providing. The pressurized air in the container void retained by peripheral ring 54 over the water surface pressurizes the void over water volume in the closed container 24 to thereby force the water in container 24 to flow through the multistages of water filter cartridge 75 and into outlet spout 40.

As illustrated in FIGS. 2 and 3, compressed air from bellows air pump 30 in outlet 10 of pump 30 flows into container 24. The generated pressurized air within container 24 forces the water level down to cause the contained water to flow into stage one 70 of the filter cartridge. Continued application of compressed air causes the contained water to flow through first filter stage 70 and into connected second stage 71. Continued application of compressed air causes the contained water to flow through second stage 71 and into third stage 72.

Continued application of compressed air causes the contained water to flow through third stage 72 and out outlet spout 40.

One-way check valve 31 on outlet 10 of air pump 30 prevents back flow of pressurized air from the contained air pressure in water container 24. One-way check valve 60 prevents back flow of water filtrate from outlet spout 40 to third stage 72 of filter cartridge 75. Container seal ring 54 retains pressurized air in the sealed container comprising water bottle 24 and unitary universal water purifier assembly device 80 inserted therein, comprising inserted filter cartridge 75. Container seal 54 seals the opening between unitary water purifier assembly device 80 and container 24.

In summary description of an alternative embodiment of the instant invention, the alternative embodiment of the instant invented universal water purifier unitary assembly device comprises multiple stages of three, four, five or more stages which are conjoined and linked together in sealed connection with O-rings to form a filter cartridge. A unitary filter assembly comprising housing unit support structure 50, air pump 30, outlet spout 46, and filter cartridge 75 are mounted on container 24 and sealed thereto by elastic annular peripheral ring 54 of sufficient size to provide a compression fit around housing unit support structure 50 and is of sufficient size and elasticity to stretch to provide a compression fit around the mouth of any container of water of any size and shape. The device housing unit support structure provides a means of mounting the elements of the water treatment device in close physical proximity together as an operational unit of easy transport to be positioned atop any suitable container of water to be treated and filtered.

The essential elements of an alternative water purified unitary assembly replicate the essential elements of the exemplified preferred embodiment. The means of providing water flow pressure to a filter assembly and sealing the universal water purifier unitary assembly device to a water container of any size and shape permits use of the water purifier assembly device to filter and purify water as a universal operating unit device to be used on small table top applications, on large size units or on water containers of any size and shape with a suitably sized mouth to permit entrance of the unitary assembly to within the water container, for use in parts of the world where even tap water is contaminated with bacteria and chemicals.

What is claimed is:

1. A water purifier unitary assembly device comprising:
   a device housing unit support structure providing a means of unifying the functional elements of said water purifier unitary assembly device in close physical proximity as a unified operational unit of easy transport;
   a manually operated air pump, supported by a container of water to be filtered, to provide compressed air in sealed connection to said container of water to be filtered and a force-fed water filter cartridge of multiple separable stages;
   a separable sealing means which provides a sealed junction and sealed aperture between mouth of said container of water to be filtered and said device housing unit support structure of said water purifier unitary assembly device, the water purifier unitary assembly device inserted within said container of water to be filtered, to retain compressed air therein;
   at least a first separable stage of said water filter cartridge comprising a container shell containing sediment and cyst removal filters and filter material;
   at least a second separable stage of said water filter cartridge comprising a container shell containing filter membranes and disinfectant resins; and
   at least a third separable stage of said water filter cartridge comprising a container shell containing water treatment media comprising porous activated carbon.

2. The water purifier unitary assembly device of claim 1 wherein said sealing means comprises an annular peripheral container seal ring.

3. The water purifier unitary assembly device of claim 1 wherein said sealing means comprises an elastic annular peripheral ring of sufficient size to provide a compression fit around said device housing unit support structure and to provide a compression fit over and around said container of water to be filtered, to seal said device housing unit support structure to said container of water to retain said compressed air within said water purifier unitary assembly device and said container of water.

4. The container of water of claim 3 wherein said container of water comprises a container of water of suitable size and shape to receive within the container the water purifier unitary assembly device and has a suitably sized opening and mouth to receive said water purifier unitary assembly device within said mouth.

5. The water purifier unitary assembly device of claim 1 wherein said container shells of said separable stages constitute container shells of suitable plastic material to provide structural strength to each container shell.

6. The water purifier unitary assembly device of claim 1 wherein said sediment and cyst removal filter comprise filters selected from the group consisting of molded porous polymeric filter material and a non-woven fabric of a fine hydrophilic sheet having a porosity of less than 2 microns and a ceramic filter having a porosity of less than 2 microns.

7. The water purifier unitary assembly device of claim 1 wherein said filter membranes of said second separable stage comprise semi-permeable membranes.

8. The water purifier unitary assembly device of claim 1 wherein said filter membranes of said second separable stage comprise hollow fiber semi-permeable membranes.

9. The water purifier unitary assembly device of claim 1 wherein said disinfectant resins are selected from the group consisting of halogenated resins comprising iodinated resins and chlorinated resin beads.

10. The water purifier unitary assembly device of claim 1 wherein said porous activated carbon comprises carbon particles and shaped carbon blocks made of coconut shell based carbon powder with mesh size of 80 times 300 wherein 95% weight passes through 80 mesh and 10% passes through 200 mesh and 5% passes through 300 mesh.

11. The shaped carbon blocks of claim 10 wherein said porous activated carbon particles and shaped carbon blocks are a matrix of activated carbon and polymeric binder selected from the group consisting of low density polyethylene (LDPE), ethylene vinyl acetate copolymer (EVA), high density polyethylene (HDPE) and ultrahigh molecular weight polyethylene (UHMWPE).

12. The shaped carbon blocks of claim 10 wherein said carbon particles and shaped carbon blocks comprise a matrix of an activated carbon powder and ultrahigh molecular weight polyethylene, the matrix surface treated with an anionic surfactant wetting agent.

13. The anionic surfactant wetting agent of claim 12 wherein said anionic surfactant wetting agent is diethylhexyl sodium sulfasuccinate.

14. The water purifier unitary assembly device of claim 1 wherein said air pump is a bellows air pump.

15. The water purifier unitary assembly device of claim 1 wherein said device housing unit support structure is mounted atop said water container and said water filter cartridge is within said water container and said device housing unit support structure is in sealed connection with opening and mouth of said water container.

16. The water purifier unitary assembly device of claim 1 wherein said three separable stages are conjoined, linked and sealed to each other by separate O-rings.

17. The water purifier unitary assembly device of claim 1 wherein sealing means to retain compressed air and to seal the opening between said water purifier unitary assembly device housing unite structure and container of water to be filtered comprises an elastic annular peripheral ring.

18. The water purifier unitary assembly device of claim 1 wherein said device housing unit support structure is mounted atop the water container in sealed connection wherein said sealing means comprises an elastic annular peripheral ring of sufficient size to provide a compression fit around said device housing unit support structure and to provide a compression fit over and around the opening and mouth of said water container.

* * * * *